United States Patent
Secord et al.

(10) Patent No.: US 12,480,916 B2
(45) Date of Patent: *Nov. 25, 2025

(54) DEVICE MONITORING SYSTEMS AND METHODS

(71) Applicant: Armstrong International, Inc., Three Rivers, MI (US)

(72) Inventors: Thomas Jack Secord, Union City, MI (US); William R. Horton, Centreville, MI (US); Michael Herman Gaines, Kalamazoo, MI (US)

(73) Assignee: Armstrong International, Inc., Three Rivers, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,064

(22) Filed: Aug. 11, 2023

(65) Prior Publication Data
US 2023/0393100 A1 Dec. 7, 2023

Related U.S. Application Data

(63) Continuation-in-part of application No. 17/585,835, filed on Jan. 27, 2022, now Pat. No. 11,726,068, (Continued)

(51) Int. Cl.
*G01N 29/22* (2006.01)
*F16T 1/48* (2006.01)
(Continued)

(52) U.S. Cl.
CPC .............. *G01N 29/226* (2013.01); *F16T 1/48* (2013.01); *G01J 5/0265* (2013.01); *G01M 3/24* (2013.01);
(Continued)

(58) Field of Classification Search
CPC .. G01N 29/226; G01N 29/14; G01N 29/2468; G01N 29/227; G01N 29/04;
(Continued)

(56) References Cited

U.S. PATENT DOCUMENTS

| | | | | |
|---|---|---|---|---|
| 4,031,418 A | * | 6/1977 | Cluzel | H04R 1/22 310/322 |
| 4,085,349 A | | 4/1978 | Farstad | |

(Continued)

FOREIGN PATENT DOCUMENTS

| | | |
|---|---|---|
| EP | 0972982 A2 | 1/2000 |
| GB | 2459319 A | 10/2009 |

*Primary Examiner* — Fatemeh Esfandiari Nia
(74) *Attorney, Agent, or Firm* — Dickinson Wright PLLC

(57) ABSTRACT

Systems and methods for components, e.g., liquid or gas handling, are described. A tester includes a wand that is handheld that can communicate with a handheld electronic device which in turn can communicate with a central monitor for storing and compiling readings as historical profile data. The wand includes an acoustic probe to physically contact the device to acoustically sense the performance of the device. The acoustic probe includes a probe tip and a stack of acoustic elements, an electrode, a stack mass, and a head to convert the acoustic signal into an electrical signal. The tester can include onboard force sensors associated with the probe or a temperature sensor. The tester or a handheld device includes circuitry to process the information, interact with the user, and transmit information to and from the handheld electronic device and/or the central monitor.

20 Claims, 11 Drawing Sheets

Related U.S. Application Data which is a continuation of application No. 16/579,176, filed on Sep. 23, 2019, now Pat. No. 11,255,823.

(60) Provisional application No. 62/735,601, filed on Sep. 24, 2018.

(51) Int. Cl.
*G01J 5/02* (2022.01)
*G01M 3/24* (2006.01)
*G01N 29/04* (2006.01)
*G01N 29/14* (2006.01)
*G01N 29/24* (2006.01)

(52) U.S. Cl.
CPC ............ *G01N 29/04* (2013.01); *G01N 29/14* (2013.01); *G01N 29/227* (2013.01); *G01N 29/228* (2013.01); *G01N 29/2437* (2013.01); *G01N 29/2468* (2013.01); *G01N 2291/023* (2013.01); *G01N 2291/104* (2013.01); *G01N 2291/269* (2013.01)

(58) Field of Classification Search
CPC ............. G01N 29/228; G01N 29/2437; G01N 2291/023; G01N 2291/104; G01N 2291/269; F16T 1/48; G01J 5/0265; G01M 3/24
USPC ........................................... 73/587, 592, 584
See application file for complete search history.

(56) References Cited

U.S. PATENT DOCUMENTS

| | | | | |
|---|---|---|---|---|
| 4,898,022 A | * | 2/1990 | Yumoto | ............... F16T 1/48 236/94 |
| 5,457,640 A | | 10/1995 | Foller et al. | |
| 6,220,098 B1 | * | 4/2001 | Johnson | ............... G01H 1/00 73/660 |
| 11,255,823 B2 | * | 2/2022 | Russell | ............... G01N 29/326 |
| 11,726,068 B2 | * | 8/2023 | Russell | ............... G01N 29/326 73/592 |
| 2011/0316707 A1 | | 12/2011 | Gaines et al. | |
| 2012/0204650 A1 | * | 8/2012 | Kleven | ............... G01N 29/2462 73/644 |
| 2016/0345082 A1 | | 11/2016 | Armstrong et al. | |

* cited by examiner

DEVICE MONITORING SYSTEMS AND METHODS

CROSS-REFERENCE TO RELATED APPLICATION

This U. S. Continuation-In-Part Utility patent application claims the benefit of and priority to U.S. Utility patent application Ser. No. 17/585,835, filed on Jan. 27, 2022, titled "Steam/Hot Water Device Monitoring;", U.S. Utility patent application Ser. No. 16/579,176, filed on Sep. 23, 2019, titled "Steam/Hot Water Device Monitoring;" and U.S. Provisional Patent Application Ser. No. 62/735,601, filed on Sep. 24, 2018, titled "Steam/Hot Water Device Monitoring;" and the entire disclosures being herein incorporated by reference.

BACKGROUND

1. Field

The present disclosure relates to a system and method for monitoring components in industrial systems. e.g., a steam system or a hot water system.

2. Related Art

Steam is used as a source of power in a variety of applications, including steam generators and steam turbines. Steam is used for heating, sterilizing, humidifying, and evaporating in several sectors such as oil refining, nuclear power plants, and food plants, as well as pharmaceutical manufacturing plants. The components that use steam and hot water should be monitored for performance. Until now such monitoring required human intervention for a manual inspection and reporting findings either in-person or via written reports. Such a manual process may not be fully reliable, is time consuming and may pose a risk (for example, risk of burning while installing the connections for the sampling or while taking the samples). Moreover, such historical manual measurements do not provide real-time information regarding the system. As such, manual measurements must be scheduled routinely in order to catch potential problems early and hopefully prevent any problems from developing into serious damage of parts and danger to personnel.

SUMMARY

According to one aspect of the disclosure, a tester for testing the operating condition of a component in an industrial system or a commercial system is described herein. Such systems can include water handling, e.g., hot water, steam, heated liquids, gases or the like. The tester can include a probe extending between a distal end and a proximal end. The distal end of the probe defines a probe tip to contact the device. The tester further includes a first acoustic element located adjacent to the proximal end of the probe tip, a second acoustic element spaced from the first acoustic element, and an electrode located between and spacing the first acoustic element and the second acoustic element. A head is electrically connected to the electrode to detect acoustic readings at the probe tip. In one or more embodiments described herein, the tester can include a processor for determining status of the component under test on-board the handheld tester. In one or more embodiments described herein, the tester can include a force sensor to activate the tester when sufficient force is applied to a probe or other contact part of the tester upon making contact to a component under test.

According to another aspect of the disclosure, a system for monitoring a component, e.g., at least one steam trap, liquid handling component, gas handling component or the like, is presented. The system comprises a central monitor remote from the component, a handheld device in communication with the central monitor, a wand including probe to mechanically contact and to test the steam trap acoustically, and a thermal sensor to test the steam trap thermally. The wand is in communication with the handheld device.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DESCRIPTION OF THE ENABLING EMBODIMENTS

Example embodiments will now be described more fully with reference to the accompanying drawings. In general, the subject embodiments are directed to a steam/hot water device monitoring system. However, the example embodiments are only provided so that this disclosure will be thorough, and will fully convey the scope to those who are skilled in the art. The present description can be applied to systems handling liquids and gases, e.g. under pressure, at room temperature, in a heated state or in a cooled state. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the views, the steam/hot water device monitoring system is intended for closely monitoring and compiling data on a steam/hot water device to accurately monitor its operational status.

Figure 1:
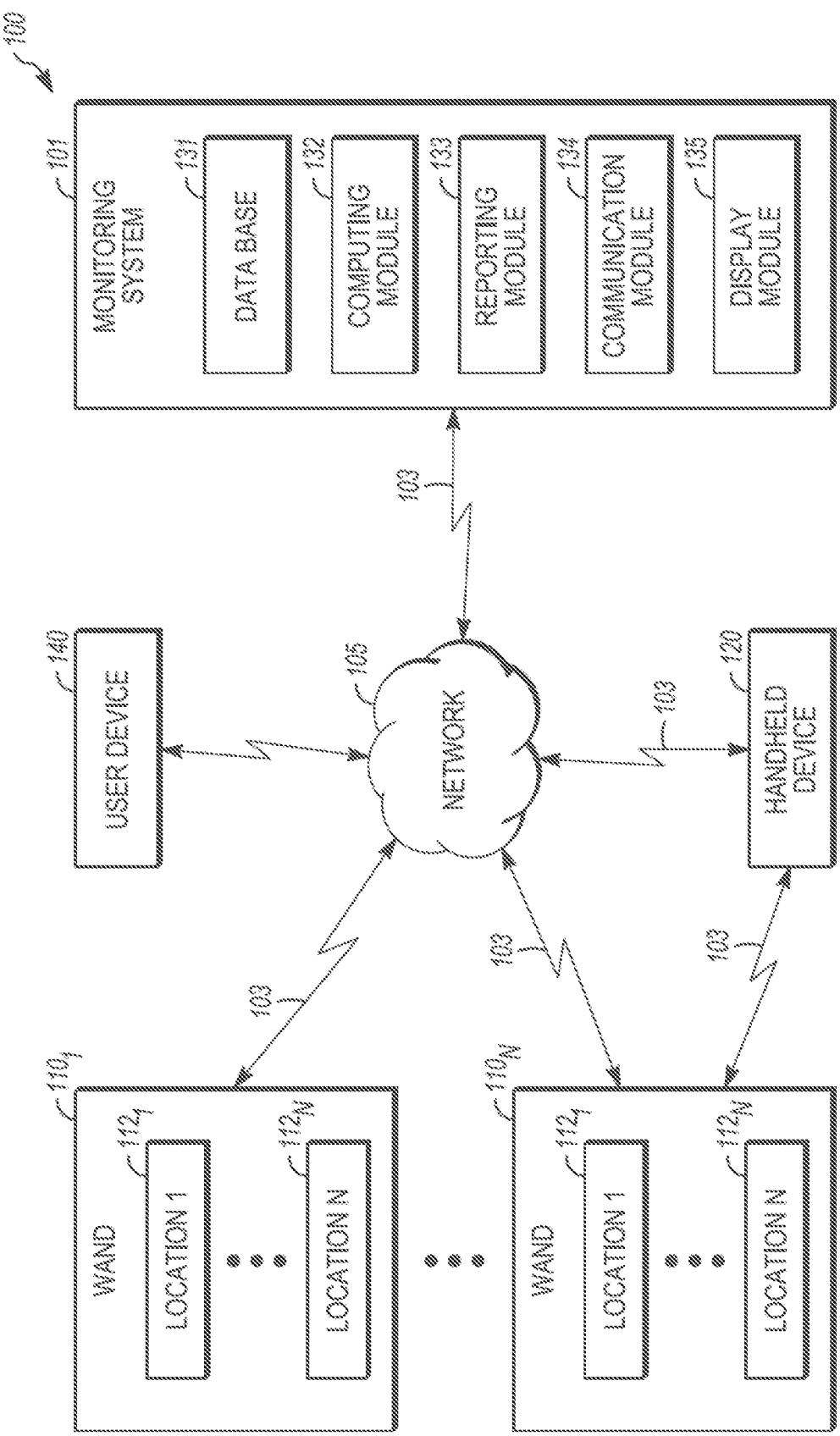
FIG. 1 is a schematic diagram of an embodiment of the disclosed system.

With initial reference to FIG. 1, an example monitoring system 100, within which vapor/liquid (e.g., steam/hot water) component monitoring, reporting and controlling can be implemented. The example monitoring system 100 includes a central monitor 101 in communication via data communication to a network 105. Wands 110 (individual ones of the wands are designated with a subscript 1 . . . N) are tester devices that employ various testing devices to diagnosis and monitor field devices that control, monitor, and supply steam and/or hot water to produce goods, thermal energy, heat or the like. The field devices can be associated with various locations 112 assigned to each of the wands 110. Each of the field devices at the locations 112 may be monitored and controlled. Monitoring may be performed as described in U.S. patent application Ser. Nos. 12/824,326 and 15/160,522, and U.S. Provisional Patent Application Ser. No. 62/165,060, which are hereby incorporated by reference. Data regarding steam or hot water devices may be sensed at locations 112 by the wand and sent to the central monitor 101 via a network 105 or via the handheld device or mobile device 120 and then through the network 105. Additionally, data may be sent from the central monitor 101 to a mobile device 120 or the wand 110. The mobile device (e.g., a handheld electronic device such as a smartphone) 120 is provided and can communicate with the wand 110. The mobile device 120 can also communicate with the central monitor 101 or other user devices 140 using data communication 103 with the network 105. The mobile device 120 may also interact directly with the field devices at a locations 112 assigned to the wand 110. The wand 110 and/or device 120 may read the operating parameters, operating conditions, or the sensed data at the field device. The field device may be designated by an identification code that is distinct from other field devices. The wand 110 may additionally apply rules, stored in onboard memory, to the data from a test and indicate the status of the component onboard or send the test result to the mobile, handheld device 120 or other user device 140.

Data communication 103 as described herein, e.g., FIG. 1 couples the various systems and devices together. The network 105 may be a global computer network, e.g., the Internet, but can be any network capable of communicating data between devices. In addition to the Internet, suitable networks can also include or interface with any one or more of, for instance, an local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DISL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications can also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, an IEEE 802.11-based radio frequency network or an IEEE 802.15-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

The central monitor 101 can be a computer system with circuitry, logic, memory and at least one processor to receive, to process and to display information received through the network 105 regarding the operation of field devices at the locations 112, including operating data sensed by the wand 110 and the handheld device 120. The central monitor 101 is dedicated to the processing of hot water or steam related information from the field device and may further be configured to control the field devices or operations at the locations of the enterprises. In an example, the data can be from the mobile device 120. The central monitor 101 includes a database 131 to store data, either related to status of devices at the locations 112 or computed data from the status of devices at the locations 112. A computing module 132 processes the received data to produce computed data, which can both be saved in the database 131. A reporting module 133 can generate reports, either electronic (editable or pdf formatted) or paper, by formatting data from the database and optionally receiving data from the computing module to produce a report in real-time. Real-time in the context of reports regarding device, group, nest, location or enterprise performance may be based on a change of data received at the monitoring system, e.g., when the received data changes a calculated value. In other examples, the report can be run at a time of day or at a scheduled time. The report can be based on the enterprise level, which can include selected locations 112 and/or selected devices at the locations 112. The reporting module 133 can generate reports at the location 112 level with selected devices from the particular location 112. A nest of field devices can include groups of devices at one particular location of facility. A group of devices may be devices within a sub-location at a location. A communication module 134 operates to allow the central monitor 101 to receive and transfer data over the network 105 from the enterprises, the location, or individual devices, either directly or from the mobile device 120. Display module 135 operates to produce formatted data for display to a user. The formatted data may be presented on an external display screen, e.g., a computer monitor, a television, a mobile device. Each module may include circuitry, e.g., processors, logic, and memory, to execute instructions on sensed data or calculated data. In an example, the central monitor 101 can receive the data from the wand 110 and the computed status of the component being tested by the wand 110. The central monitor 101 can store the computed status of the component.

Figure 2:
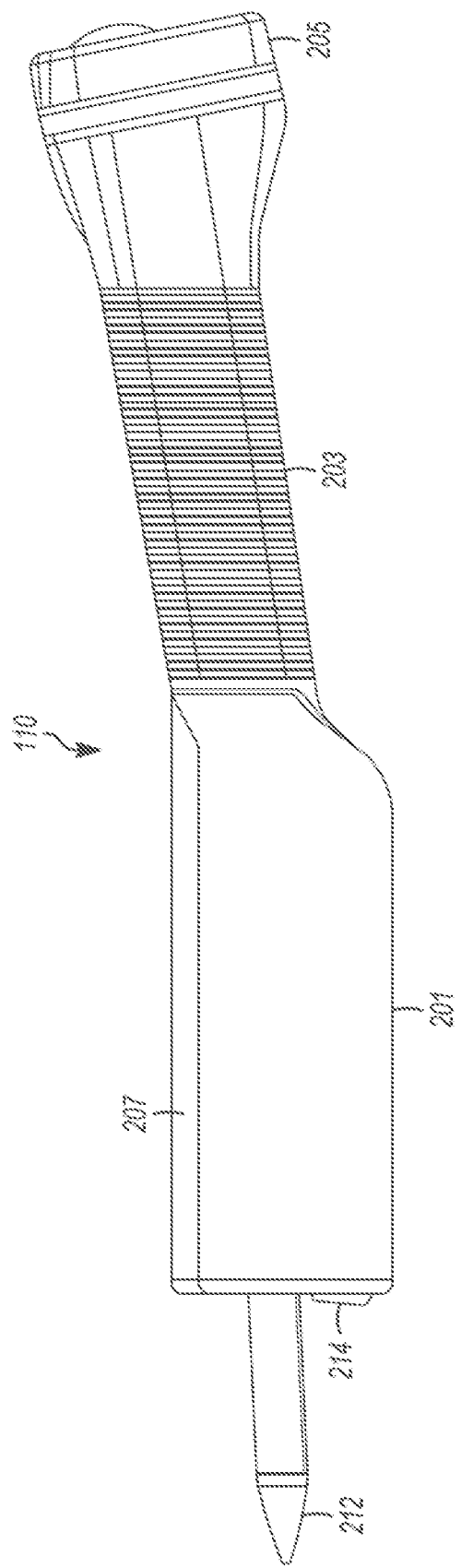
FIG. 2 is a side view of a handheld wand for testing industrial devices according to an embodiment.

FIG. 2 shows a side view of the wand 110. The wand 110 includes a main housing 201 and a hand grip 203 extending proximally (when in use) from one end of the housing 201. The proximal end (right in FIG. 2) of the hand grip 203 can increase in size to form a knob that is closed by a cap assembly 205. The housing 201 and the hand grip 203 can be integrally formed. A control panel 207 is fixed to the housing 201. The distal end of the housing 201 supports an acoustic probe 212 and another sensor 214. The sensor 214 can be a temperature sensor, e.g., an infra-red sensor. The acoustic probe 212 is designed to physically contact a device under test, e.g., a field device such as a steam trap. The sensor 214 is a remote sensor that can sense temperature characteristics of the device under test. The rear cap assembly 205 can cover the end of the hand grip to seal the interior of the wand 110 and cover a mechanical attachment point and an electrical attachment point in a selective manner. The interior of the wand 110 is sealed against the elements as the wand houses electronics and is used in industrial environments as described herein.

Figure 3:
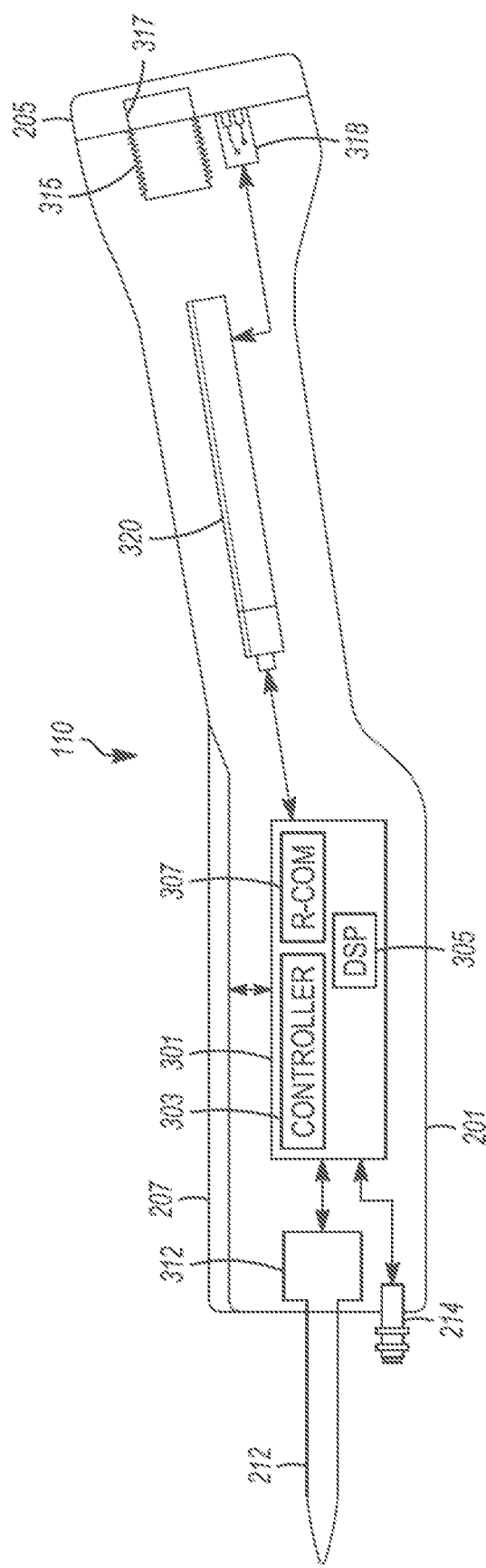
FIG. 3 is a schematic view of a handheld wand for testing industrial devices according to an embodiment.

FIG. 3 shows a schematic view of the wand 110. The housing 201 encloses and supports electronic circuitry 301 therein. The circuitry 301 includes input/output ports that communicate with the probe 212 and the sensor 214, respectively. The circuitry 301 includes a controller 303 to control operation of the wand 110. The controller 301 can receive input from the control panel 207 and output machine-to-human information to be displayed at the control panel 207. Circuitry 301 includes a digital signal processor 305 that can receive output from at least one of the probe 212 and the sensor 214 to process the output therefrom. The circuitry 301 further includes an radio frequency communication module 307, which enables the wand to wirelessly communicate with a remotely mounted RFID tag or other electronics, e.g., the mobile device 120 or other device through the network 105. The RF module 307 can operate as an RFID tag reader, Bluetooth communicator, WiFi communications and the like. The housing 201 supports the probe 212 such that a portion of the probe 212 extends forwardly from the front wall of the housing 201 to contact a device under test and sense 5 vibrations therein (e.g., ultrasonic). The probe 212 includes a sensing assembly 312 inside the housing 201 that determines the acoustic signal and communicates an output to the circuitry 301. The sensor 214 extends through the front wall and electrically communicates with the circuitry 301. A battery 320 is housed in the grip and provides power to the circuitry 301, the interface 207 and, if needed, the probe 212 and sensor 214. The cap 205 at the rear end of the wand 110 closes the rear wall and covers a mechanical connection point 315 and an electrical connection point 318. The mechanical connection point 315 can be a threaded female receptacle to receive a threaded end of a pole to increase the distance that a user can reach and apply the probe to a field device. A plug 317 can be removably positioned in the cap 205 such that the mechanical connection point can be accessed. The electrical connection point 318 can be used to charge the battery 320 and/or provide a wired connection to the circuitry 301.

Figure 4A:
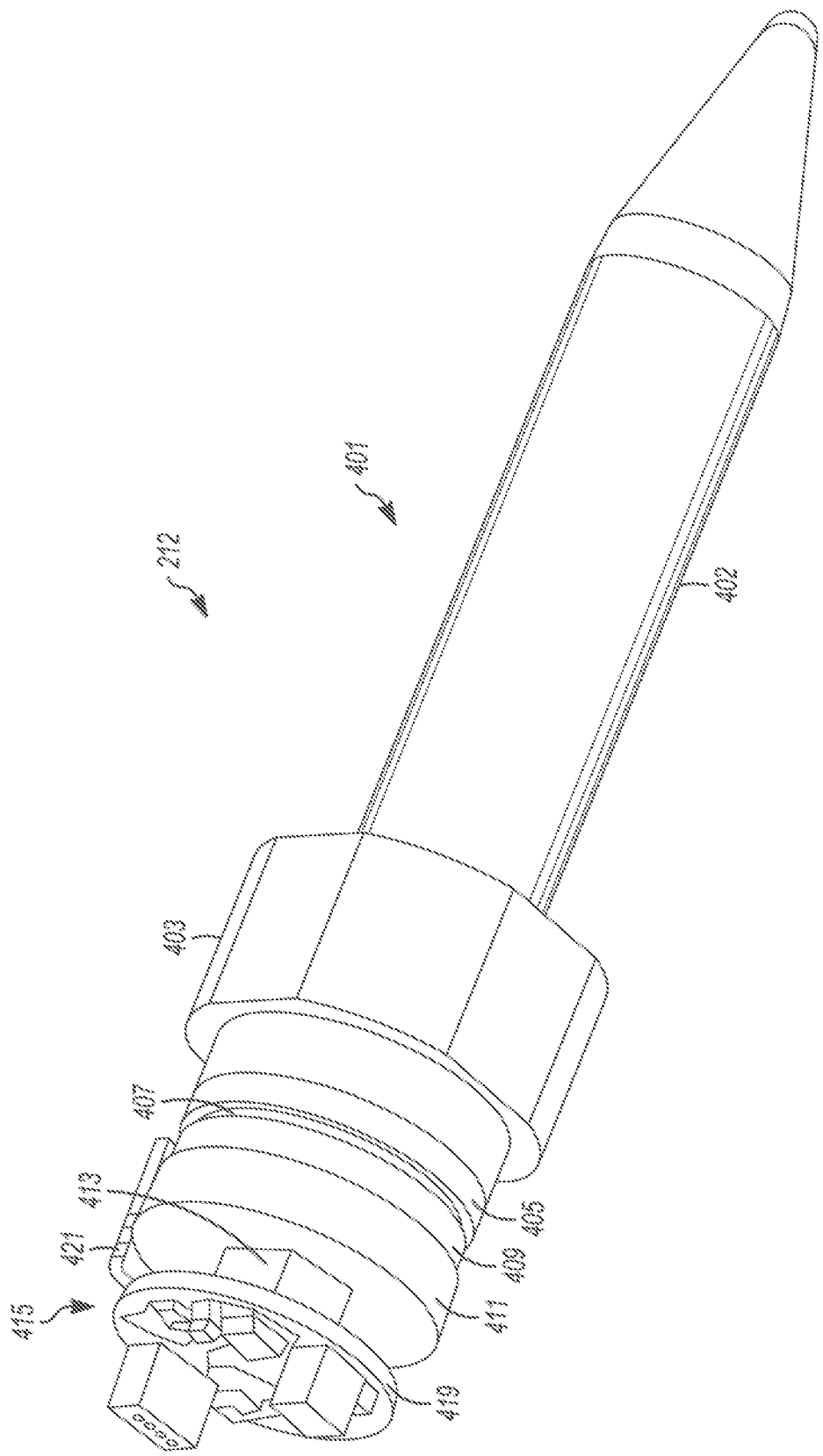
FIGS. 4A and 4B are views of a probe assembly for a handheld wand for testing industrial devices according to an embodiment.
Figure 4B:
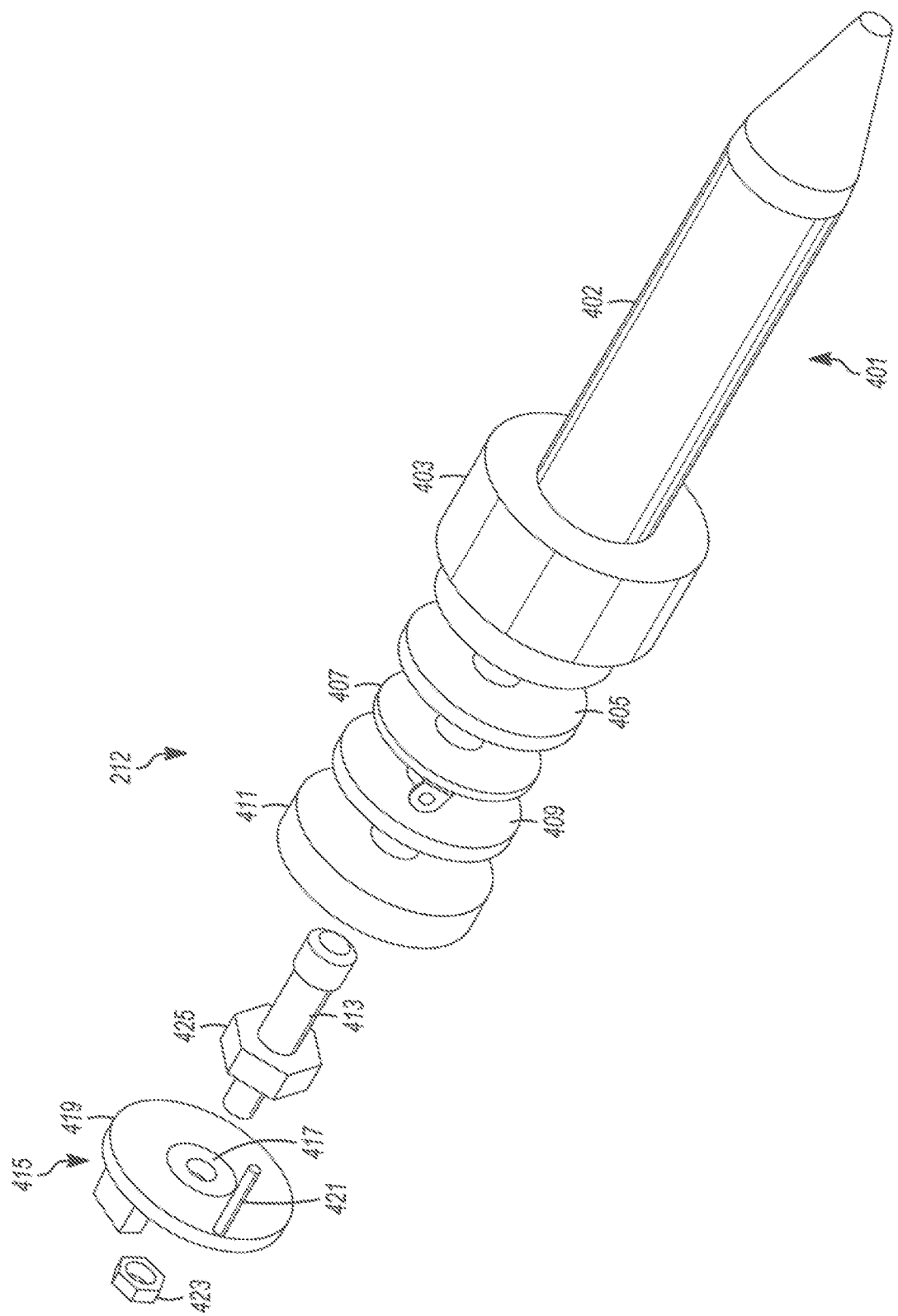

FIGS. 4A and 4B show the probe 212. More specifically, FIG. 4A shows an assembly view from the proximal end and FIG. 4B shows an exploded view of the probe 212 used in the wand 110. The probe 212 includes end assembly 401 including a probe tip 402 and an acoustic isolator 403. The probe tip is elongate and tapered at the contact towards a distal end that physically contacts a device under test. The acoustic isolator 403 is at a proximal end of the probe tip 402 and extends around the exterior of the probe tip 402. The acoustic isolator 403 can be fixed to, e.g., by over molding, to a head of the probe tip 402. The acoustic isolator 403 supports the probe tip 402 and fixes the probe tip 402 to the housing 201 while isolating the probe tip 402 from acoustic signals that may be from the housing 201. A stack of a plurality of elements are positioned proximally from the acoustic isolator 403 on a stud 413 that has its end fixed to the head of the probe tip 402. The remainder of the stack includes a first piezo-electric acoustic element 405, a stack shim 407, a second piezo-electric acoustic element 409 and a stack mass 411. These elements 405-411 are annulus shaped to allow the stud 413 to extend through the center apertures thereof to the probe tip 401. The head of the stud 413 fixes to the proximal end of the probe tip 401. The first piezo-electric acoustic element 405 and the second piezo-electric acoustic element 409 are spaced from the stud 413. The first piezo-electric acoustic element 405 and the second piezo-electric acoustic element 409 have a height greater than the stack shim 407. The stack mass 411 also does not contact the stud 413 at its interior edge. Spacing between interior edges of the stack mass 411, the acoustic element 405, and the second acoustic element 409 and the stud 413 may be attained via physical spacers (not shown) or via a load that sandwiches all the elements axially on the stud 413. The stack mass 411 has a height greater than the first piezo-electric acoustic element 405, the second piezo-electric acoustic element 409, and the stack shim 407. The stud 413 includes an external protrusion, here shown as a fixed nut 425, that loads a force onto the stack mass 411 and the other elements of the stacked assembly. A head 415 is posited at the proximal end of the stud 413 on the other side of the protrusion of the stud 413. The head 415 includes a negative ground plane 417 connected to the stud 413 interior to an amplifier disk 419 that is held onto the stud 413 by a nut 423. The disk 419 can support integrated circuitry to process the acoustic signals sensed at the probe 212 and output an amplified electrical signal. A connector 421 connects the amplifier disk 419 to the stack shim 407. The stack shim 407 can operate as a positive electrode. The probe 212 contacts a device at the distal end of the probe tip 402. The acoustic signals travel the length of the probe tip and are converted to an electrical signal by the elements 405, 409 as loaded by stack mass 411, which can act as an inertial damper. A positive electrical signal travels the connector 421 to the head 415 with the negative connection being the negative ground plane 417, through the stud 413 to the shim 407 and probe tip 402. The elements of the probe 212 are designed to acoustically sense in the ranges of about 20-100 kHz, 30-80 kHz or 30-60 kHz. Thus, the present probe 212 operates on a wide band of at least 15 kHz or at least 20 kHz or over 30 kHz. The amplifier disk 419 design conditions the acoustic signal to suppress the transient external electrical signals.

Figure 5:
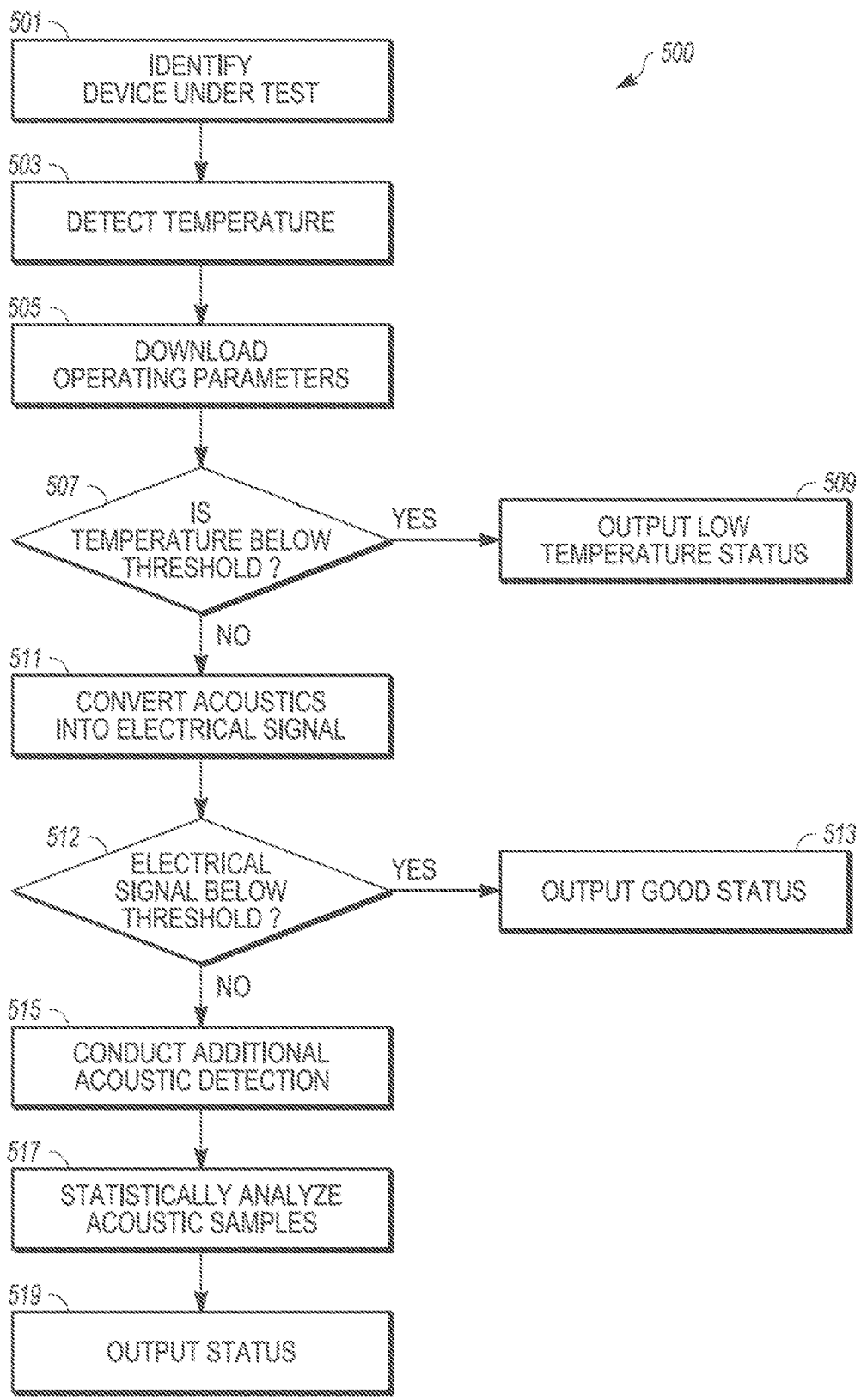
FIG. 5 is a view of a flow chart of a method according to an embodiment.

FIG. 5 is a flow chart of a method 500 for using the systems as described herein. The testing wand interacts with a device in an industrial environment, e.g., a steam trap. At 501, the device is identified. Identification can be the user entering an identification number or serial number of the device into the wand or the handheld device or scanning the RFID tag with the wand. At 503, the temperature of the device is detected. The temperature can be detected using the sensor on the wand, e.g., through a non-contact infra-red sensor or through a contact thermal sensor. At 505, the operational parameters of the device being tested are downloaded. The download can be from a server, e.g., the monitoring system or another computer server, to the handheld device and then to the wand. The operational parameters can include the make and model of the device. The operational parameters can include the differential pressure at which the device operates, in particular for steam traps. The operational parameters can also include the operational temperature ranges of the device, the surface type and the emissivity of the material of the device.

At 507, it is determined if the sensed temperature of the device is below a threshold for that device. The temperature threshold is factory set by the known operational parameters, which can include the set operating temperature range for the device in the system design. The testing wand or the handheld device can correct for the device itself. For example, when using an infra-red sensor to determine temperature, the process can account for the type of material or material finish of the device, which can be a stainless steel device, a cast iron device, a steel alloy device, etc., all of which may or may not be painted. Each of these types of devices or surface finishes may have a different emissivity than another. The differences in emissivity between materials and/or surfaces may be used in adjusting and comparing thresholds. If the temperature is low, then the wand or the handheld device will output a low temperature status and the process will end at 509. The low temperature status will indicate that the device or the system is not operating in the target temperature range and further readings are not done as such readings may not be accurate.

At 510, the tester wand detects the acoustics of the device under test. The probe tip of the wand is brought into contact with the device under test. The probe tip conducts acoustic signals to the circuitry of the wand for the device under test. The signal is then converted at 511 into an electrical signal that is amplified by the circuitry. In the case of steam traps, the probe and wand can be that described above with reference to FIGS. 2 through 4B. At 512, it is determined if the electrical signal corresponding to the acoustic reading is below a measurement threshold for the device under test. If yes, then at 513, a device good status is output. In the case of testing a steam trap, an above threshold determination indicates that the steam trap is in blow though or leaking. If the acoustic signal is above the measurement threshold, then the wand performs additional acoustic detection at 515. The wand conducts an additional N acoustic samples over a set time period P. In an example, N is at least five. If the steam trap is discharging, the number of samples increases above five, e.g., ten or twenty more samples. Each sample period P can be up to twenty seconds in an example embodiment. The sample period P can be at least fifteen seconds or up to about thirty or forty seconds. At 510, the tester wand can simultaneously read the temperature while the probe is sensing acoustic signals to correlate the temperature to each sample.

At 517, after the sample period 515, a plurality of discrete samples is known. The wand or the handheld can statistically process the samples to determine the state of the device under test. At 519 the status is output, e.g., on the wand, on the handheld display, stored in either or both of the wand and handheld, and when a communication between the handheld and the central monitor is established, the status and the data can be transmitted to the central monitor. The statistical processing can include using each discrete sample as its own result and if the number of good results are greater than a number of bad results, then the device is labelled as good. The statistical analysis can also determine that a device is good if any one of the discrete samples is good. This can account for results that occur when a steam trap is active, which can skew the results.

Figure 6:
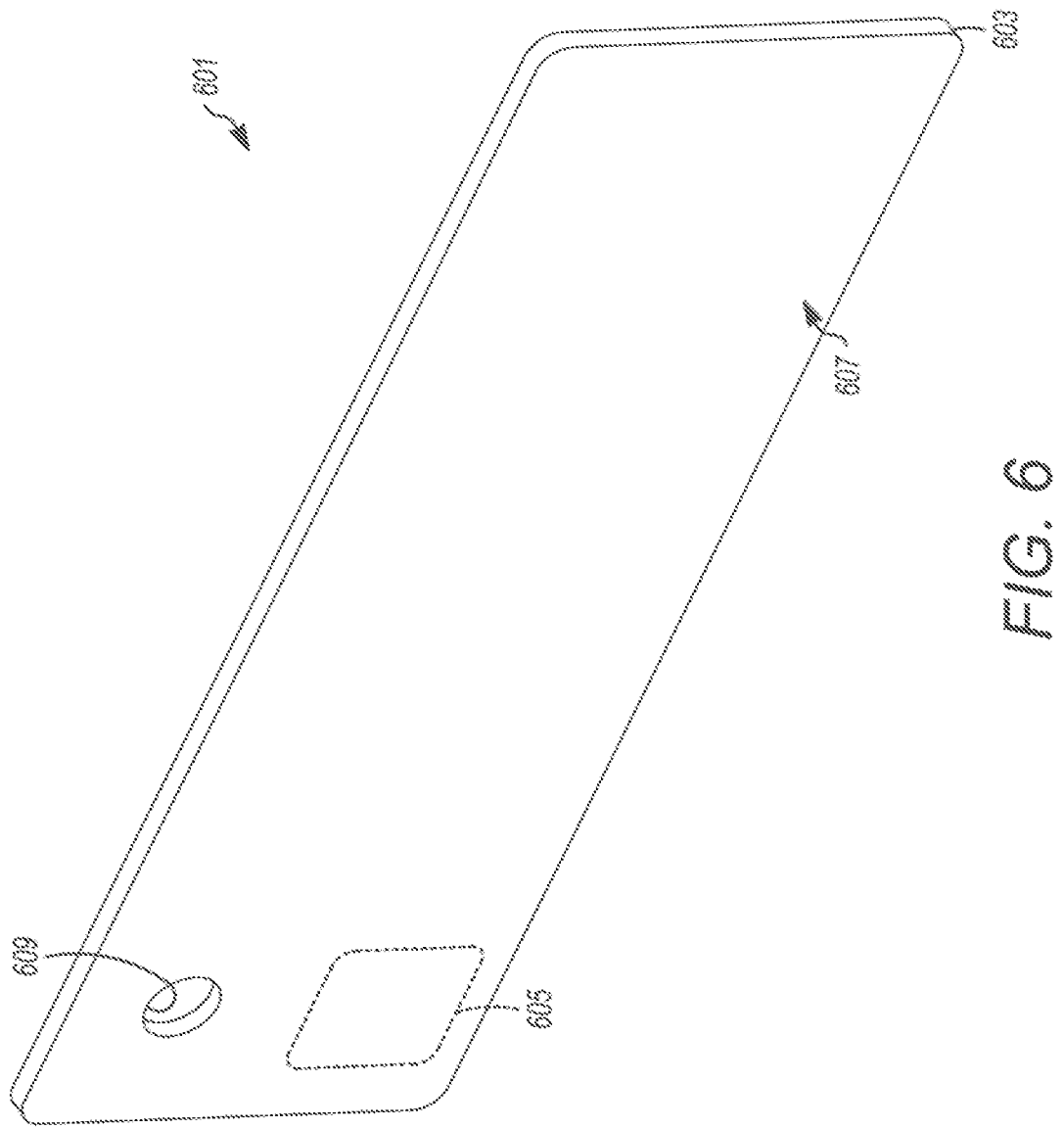
FIG. 6 is a view of a system that utilizes an RFID tag according to an embodiment.

FIG. 6 shows a view of identification tags 601 that can be associated with a device under test, e.g., secured on or closely adjacent the device. The tags can be secured to inlet pipes or outlet pipes connected to a steam trap. The tags 601 include a main body that is rigid, e.g., a metal or a polymer. The tags 601 include an embedded RFID circuitry 605 that can be interrogated by a testing wand 110 to identify the associated device under test. The tags 601 can include highly visible coatings, e.g., reflective or luminescent finishes, e.g., paint. The tags can include an identification number 607 that can uniquely identify the adjacent device. A connection point 609 is provided to secure the tag adjacent to a device, e.g., using a wire through the connection point and around a pipe connected directly to the device.

Figure 7:
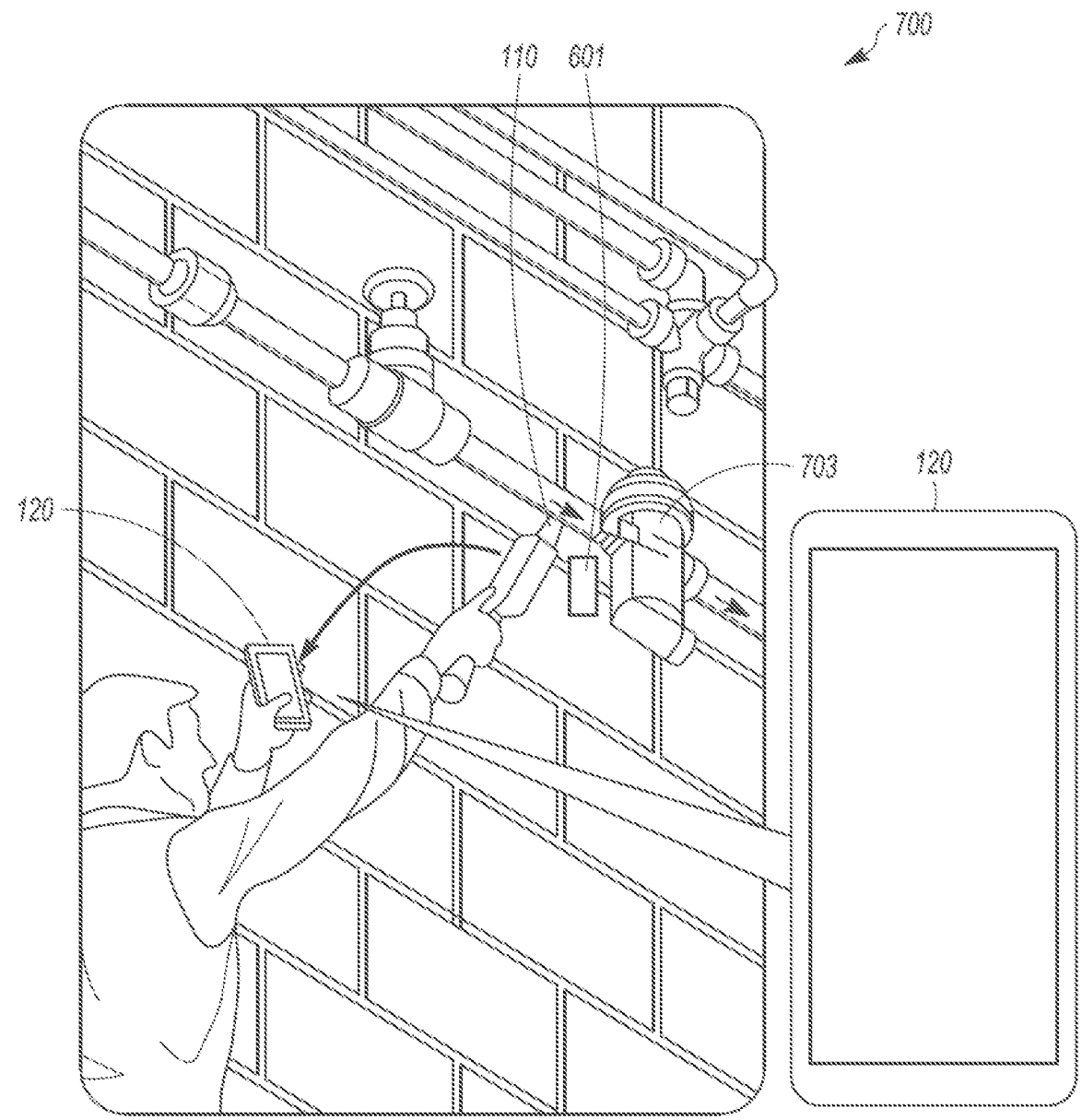
FIG. 7 is a perspective view of the handheld wand paired to a mobile device during a steam trap testing procedure.

FIG. 7 shows a system 700 with a testing wand 110, device under test 703, identification tags 703 associated with the device under test, and the handheld device 120. The handheld device 120 also is shown on an enlarged scale to show its display of data relating to the device under test 703. The user initiates start of a test of the device 703 by pressing a single icon on the handheld display or on the wand 110. The wand 110 is brought into close proximity to the identification tag 703. The wand identifies the device 703 as the steam trap to be tested. The handheld 120 can confirm that this steam trap is the one loaded into the handheld or wand to be tested. In the alternative, the wand informs the handheld of what device it is testing. After the device 703 is identified, the wand makes contact with the device 703 and its temperature is detected. The testing procedure continues with the user moving the probe tip on the wand into contact with the device 703 and holding it in place. The handheld device 120 can be held upward as shown or may be in a pocket, holster or other carrying location as desired by the user. The wand conducts the testing and then, via short range wireless communication, communicates the testing results and data to the handheld device 120. The handheld device 120 can be loaded with an application, which includes devices for testing, calculation and display of testing related data and data associated with the device 703.

Figure 8:
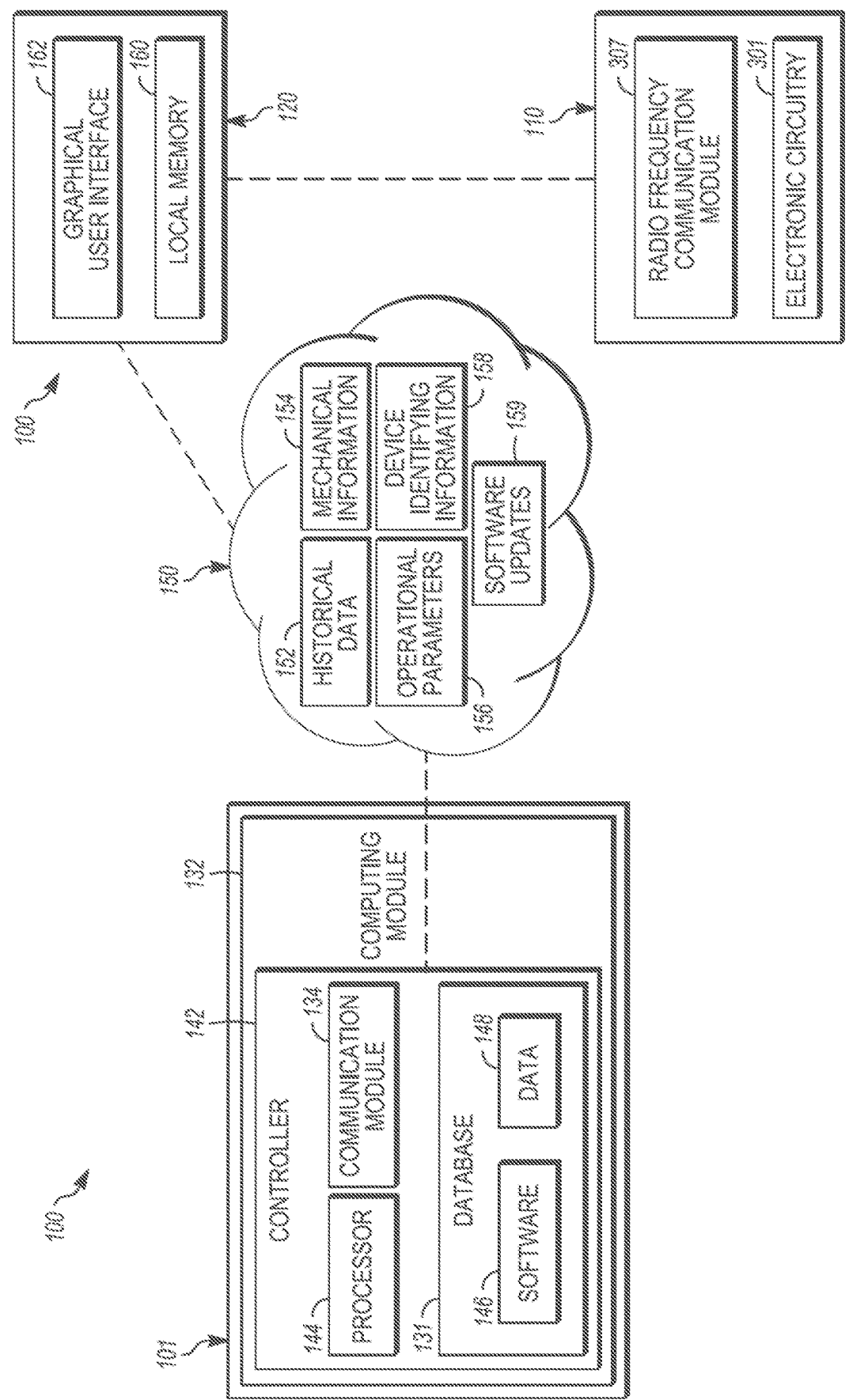
FIG. 8 is a schematic view of central monitor forming a connection to a testing wand via a handheld device.

Referring now to FIG. 8, one example block diagram of a monitoring system 101 communicating with handheld device 120 that is communicating with a wand 110 is shown. The various elements provided therein allow for a specific implementation. Thus, one of ordinary skill in the art of electronics and circuits may substitute various components to achieve a similar functionality. As previously described, the monitoring system 101 includes the computing module 132. The computing module 132 may include one or more controllers 142 having a processor 144 and the database 131 that contains machine readable non-transitory storage. Programs and/or software 146 are saved on the memory database 131 and so is data 148 obtained via the many readings from various wands 110N, other sensors, and handheld devices 120. Information packets 150 can be sent via communication module 134 to the handheld device 120. The information packets 150 can include historical data 152 of readings associated with the devices that are scheduled to be tested, such as acoustic and temperature readings. As such, a trend of increasing or lowering values over several scheduled tests over an extended period of time may be an indication of deterioration. The information packets 150 may further include the mechanical information 154 about the device that is scheduled to be tested, such as emissivity of the material or paint. The information packets 150 may further include operational parameters 156 of the device that is scheduled to be tested so that personnel carrying out the testing can determine onsite if readings indicate good operating conditions, poor operating conditions, and/or dangerous operating conditions. For example, the operational parameters 156 may include an expected readings or a threshold safety value for specific devices, wherein readings over the predetermined safety value will alert the personnel to evacuate and/or change operating conditions that make the device unsafe. The information packets 150 may further include device identifying information 158, such that a reading by the wand 110N, for example via RF module 307, is sent from the wand 110N to the handheld device 120 to associate with the relevant data specific to that device. As such, in operation, an information packet 150 associated with a location or facility scheduled to be tested is sent before the testing personnel enter the location. The information packet 150 is thus stored in a local memory 160 on the handheld device 120 such that operations can continue without requiring wireless communication between the handheld device 120 and central monitor 101. Once the wand establishes an RFID reading, the handheld device 120 locates and relies on information specific to that device, via device identifying information 158, from the information packet 150 which may include information for a plurality of devices. The handheld device 120 may further include a graphical user interface 162 that assists in establishing connections to central monitor 101 and one or more wands 110N. The graphical user interface may further provide visual representations of readings, facility maps, and other visual cues associated with data in the information packet 150. In addition to receiving information from the central monitor 101, the handheld device 120 also receives readings from the wand 100N that are saved in local memory 160 and then sent to the central monitor 101. The handheld device 120 can also send information to the wand 110N, such as software updates to controller 301. Likewise, the information packet 150 may also include software updates 159 for either a local application on the handheld device 120 and/ updates to be sent to wand 110N upon pairing.

Figure 9:
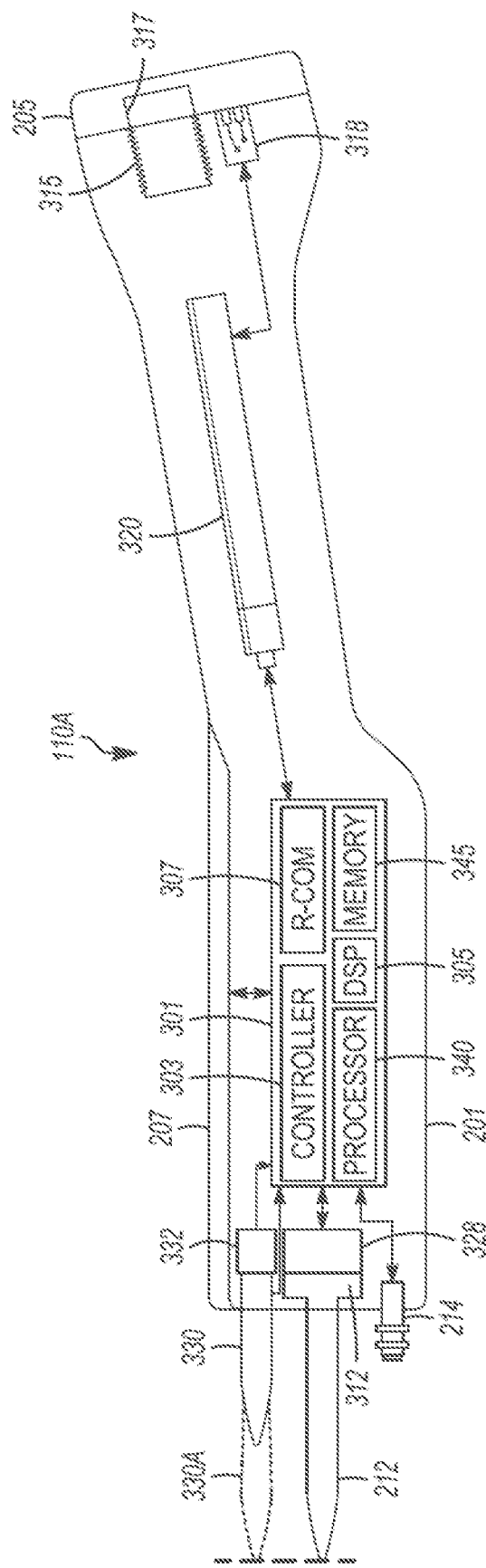
FIG. 9 is a schematic view of a handheld wand for testing industrial devices according to an embodiment.

FIG. 9 shows a further example of a schematic view of the wand 110A similar to the wand 110 of FIG. 3 with some additional elements. A contact temperature probe 330 extends outwardly from the body of the wand 110A. The temperature probe 330 can extend outwardly in the same direction, or parallel with the acoustic probe 212. The temperature probe 330 can be shorter in length that the acoustic probe 212. In an example embodiment, the temperature probe 330 is offset from the acoustic probe 212 in an example embodiment the temperature probe 330, 330A is located below the acoustic probe 212 with reference to the wand 110A with the wand display facing upward in the use position. In another example embodiment, the temperature probe 330, 330A is above the acoustic probe. The temperature probe 330 is adapted to make physical contact with a component being tested to detect its temperature while in physical contact with the component. In operation, the wand 330 is rotated such that the temperature probe 330 can contact the component under test before the acoustic probe 212 contacts the component. In another embodiment, the temperature probe 330A extends from the face of the wand 110A the same distance as the acoustic probe 212. The tip of the temperature probe 330A and the tip of the acoustic probe 212 are in the same plane and adjacent each other. The tips of the temperature probe 330 and the acoustic probe 212 can make physical contact with the component at the same time. The temperature probe 330A is adapted to not interfere with the acoustic characteristics of the component under test in the frequencies that are being sensed with both probes 330 and 212 contacting the component. With both of the probes 330 and 212 contacting the component at the same time, the temperature can be sensed while the acoustic characteristics of the component are being sensed. The temperature probe 330, 330A is acoustically isolated from the acoustic probe 212. In an example embodiment, the temperature probe 330, 330A is mounted to acoustic dampening material secured within the housing 201.

The temperature probe 330, 330A, can be removably mounted to a port in the wand, e.g., a threaded connection. The threaded connection can be mounted to or include acoustic dampening material. The acoustic dampening material, e.g., a polymer, can be tuned to the frequencies of interest sensed by the acoustic probe 212. The wand 110A can be a kit with multiple different lengths and sizes of a temperature probe 330. The lengths of the temperature probe 330, 330A can be changed by removing a mounted probe and replacing it with a temperature probe having a different length, e.g., probe 330 for probe 330A and vice versa. There can be temperature probes of lengths intermediate the temperature probes 330, 330A, shorter than the temperature probe 330, or longer than the temperature probe 330A, (as shown in FIG. 9) or combinations thereof.

The wand 110A can also include an acoustic activation sensor 328 and a temperature activation sensor 332 that are connected to the acoustic probe 212 or the temperature probe 330 (or 330A). The activation sensors 328 and 332 output an activation signal the wand circuitry 301 to either turn ON or activate the wand circuitry 301 to begin sensing operation. The activation signal will indicate to the wand circuitry that a force on the probe from a user pressing the wand 110, 110A against a potential component has been reached. In an example, the activation sensor 328 or 332 includes a switch that changes state when at least one of the probes is deflected to depressed when in contact with a device being tested. Either, or both, of the activation sensor 328 and the activation sensor 332 can be a MEMS pressure sensor and/or a MEMS movement sensor. Such a MEMS sensor can be a capacitive MEMS switch is developed using a moving plate or sensing element, which changes the capacitance, or an ohmic switch using electrostatically controlled cantilevers, which changes the ohmic resistance. The MEMS activation sensor 328 or 332 can be powered by the power source onboard the wand 110, 110A In an example, the activation sensor 328 and the activation sensor 332 can be a force sensing resistor or a load cell. In an example, the activation sensor 328 or 332 can detect the force being applied to the probe 212 or 330, 330A by a user engaged with the handheld wand to press the probes against the component. In many examples, the component is stationary or fixed at a location, e.g., connected in a rigid fluid line, e.g., steel or iron pipes. The wand circuitry 301 can have a range of force between which the probe(s) should be held against the component for sensing either the acoustic signal or the temperature of the component. Depending on the component, the lower force threshold or the upper force threshold, or both can change.

Figure 10:
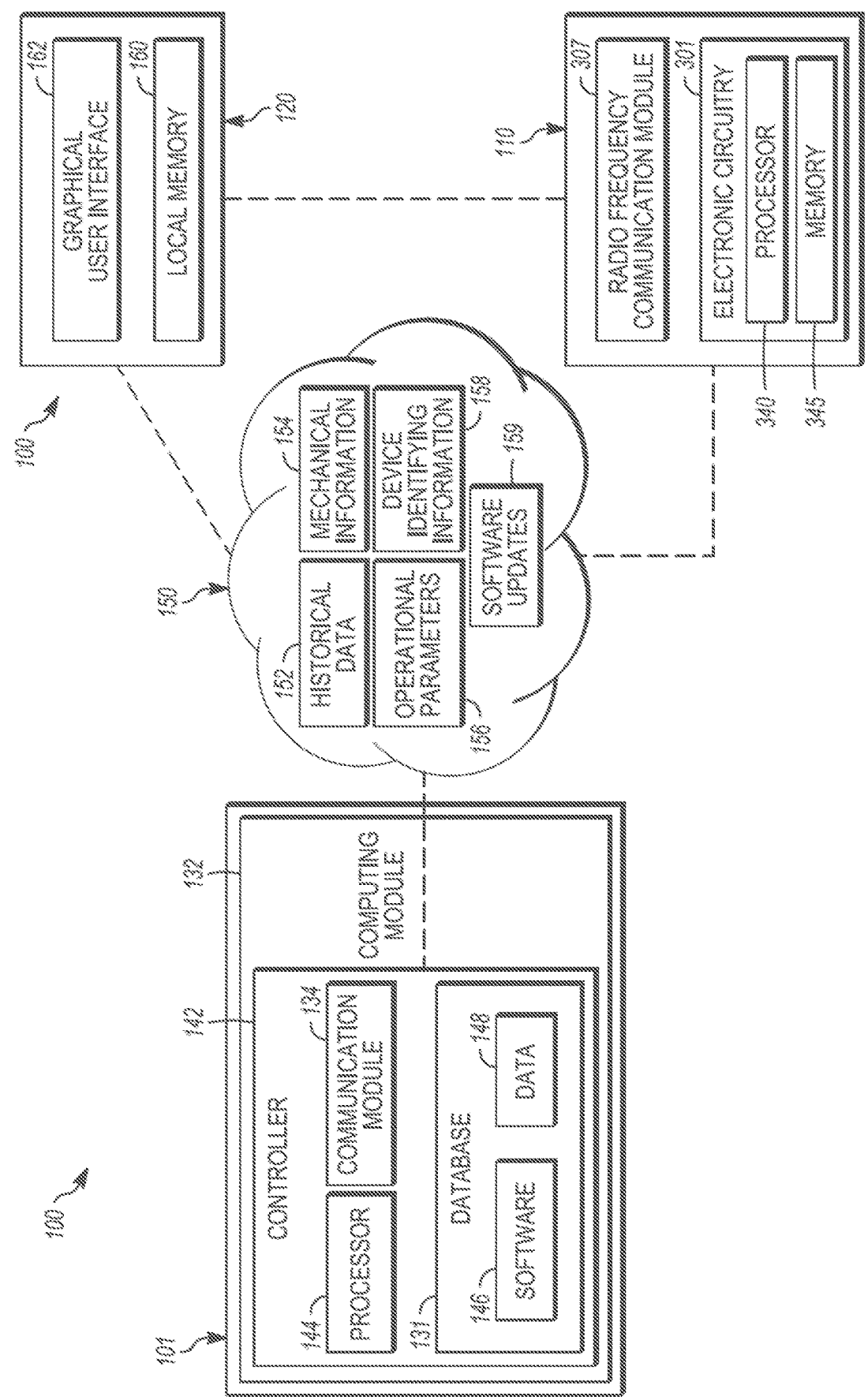
FIG. 10 is a schematic view of central monitor forming a connection to a testing wand via a handheld device.

The circuitry 301 onboard the wand 110A can include a processor 340 and a memory 345, which are electronically, operably connected (see also, FIG. 10). The memory 345 can store data related to the pressure thresholds, temperature thresholds, and the acoustic ranges for the components to be tested. The memory 345 can store data related to the order of the components to be tested. The memory 345 can store data related to identification of the component to be tested. The memory 345 can store processor instructions to load and process the sensed data. The stored instructions can be loaded to the processor 340 from the memory 345. The processor 340 can output a display signal to a display showing the user that they are pressing the probes against the component within the range for the component under test. The processor 340 can output a GUI with a vertical graph showing an acceptable indicator, e.g., green color indicium, between the upper and lower limits of the force range and an unacceptable indicator, e.g., a red color indicium, when the force applied is outside of the range.

The processor 340 can also compute, based on instructions loaded from the memory 345, if the component under test is in an acceptable state or a bad state. The instructions for each component to be tested by the handheld device 110 can be down loaded from the monitoring system 101, e.g., over a direct connection or over a communication network 150. The instructions can be part of a software update 159.

The wand 110 can be activated to test a device based on a single user input, e.g., pressing a pressure switch on the wand or by the force sensing switch or both. In an example embodiment, the wand remains in a low power state until one of the activation sensor 328 and the activation sensor 332 sends an activation signal to the wand circuitry 301. The wand then conducts a testing sequence, e.g., the process as described herein. The wand automatically sends the testing output to the handheld device 120, which in turn is running an application that will automatically synchronize its stored data with the central monitor 101. The testing output can be the results of the onboard computations in the handheld wand 110. The wand 110 and handheld device 120 communicate using a short-range communication protocol. The handheld device 120 and the central monitor 101 can communicate over a global communication or computer network, e.g., cellular wireless channels or over the Internet. In an example, the wand is powered to an ON (e.g., active) state when one of the contact force sensors senses a force at one of the mechanical contact sensors, e.g., the probe 212 or the temperature sensor 330. The wand 110 can also display or otherwise communicate to the user if a force being applied by the probe 212 and/or temperature sensor 330 is within or outside of a predetermined range of forces to achieve optimal sensing. If the sensed force is either below a lower bound of the range or above an upper bound of the range, then the wand 110 can communicate this information to the user so that the user can make a force adjustment to allow optimal sensing to be achieved.

The wand can operate to wirelessly identify the device under test, e.g., by reading an RFID tag, a bar code, a QR code, serial number, ID number or other unique identifier at the location of the device under test. In an example, the temperature probe 330, 330A is pressed against the device to be tested and the activation sensor 332 sends an activation signal to the wand circuitry to start an interrogation process to read the identity of the device under test.

The user device 140 or the handheld device 120 can show a dashboard of received data and computed data related to any one or combination of tested field devices. The dashboard can be produced by a display module and optionally with other modules of the monitoring system 101 (FIG. 1). The dashboard can be on a monitor that is part of or in communication with the central monitor 101 (FIG. 1). The dashboard includes a device field that is used to designate a particular device. The display can show the status of the device under test. In the example of steam traps being tested by the wand 110, the display can show if the steam trap testes as good, leaking, leaking heavy or blocked. Other devices being tested can be rated as good or ba.

The dashboard can display fields relating to additional systems. The additional fields can relate to the overview and operational details of device under test or the system in which the device operates. The field may be used to display a steam system along with its associated data and calculations. The field may be used to display a hot water system along with its associated data and calculations. Such a field can include information relating to the type of system, its name, its current status, and a link to display additional details regarding the system. The additional details can be the current temperatures of water in a hot water system or the current settings in the system. Details can also include information on maintenance and devices in the system displayed in field. For example, a device may be tested after a scheduled maintenance to ensure that the device is fully operational.

An alerts field can be provided by dashboard. The alerts field can display device values that related to devices under test or to devices being used in the enterprise, location, group, or system that is subject to the dashboard and may be part of the calculations being used to generate the values being displayed, e.g., good, leaking, leaking heavy, blocked, etc. The device values can be one or more values or indicators, e.g., colors, lights on the like. When the temperature of the device is tested with the acoustic signal being sensed, if the temperature deviates more than predetermined value Y from the base temperature previously sensed, then that result may be discarded or signal an error in the testing process and require restarting the testing procedure, e.g., at step 503.

The handheld device 120 can include a graphical user interface 162, which shows the profile details of a selected field device. In an example, a user may gesture on the field device area in GUI, e.g., tap or swipe. The handheld device 120 will then produce the profile history for the selected field device, for example via association with the RFID. The profile history data can be stored in the handheld device 120 when the handheld device 120 has a quality communication connection prior to entering the environment of the field device. The profile history data may include the installation date, the tag ID, the manufacturer name, the model number, the connection size, the maximum operating pressure, the physical location, the application information, the supply information, the steam pressure in, and the like. However, other types of field devices may have different profile information that is pertinent to that field device or application. All of this data can be downloaded to the mobile device before the mobile device enters the environment of the field device.

The present disclosure works with steam/hot water systems that contain devices to control, condition, manage, and monitor the steam or hot water. Such devices can be steam traps, e.g., those described in U.S. Patent Publication No. 2011/0316707, which is hereby incorporated by reference. Other examples of such devices include, but are not limited to, steam tracing devices, condensate controllers, pressure-reducing valves, temperature regulators, condensate coolers, drain separators, water temperature controls, water heaters, boilers, digitally controlled valves, digitally controlled mixers, and the like. Devices as part of the hot water system or a steam system can be elements that control or affect the operation in some manner. Some devices may include mechanical components. Some devices may be purely mechanical in nature. Some devices may include electrical components. The present system can monitor these devices and store the results in a memory, e.g., a central database. The data can be collected using a mobile device or be automatically reported from the devices if connected to a network. Some devices may have a memory that stored operational parameters and this data must be downloaded, e.g., over the network 105, to the monitoring system 101. The present system can further process this data to indicate performance of a system at an enterprise, location, group, nest or device level.

A gesture as used herein is a movement adjacent to a mobile device or other mobile device, e.g., a display, which can be sensed by circuitry in therein. Gestures can include a single touch gesture or a multi-touch gesture using one or two fingers to trace out a particular trajectory or pattern on or near a display or sensors. The sensors can be capacitive, resistive or optical. The gestures are sensed and used as input by the mobile device or other device.

The presently described methods and systems can be used with hot water systems to monitor the system and provide real-time status updates. In an example, the real-time updates can be sent from the central monitor 101 over the network to handheld devices 120, in the form of electronic messages, e.g., email, SMS messages, MMS messages or digital audio messages. The alerts can also be sent from the central monitor 101 to an application running on a remote electronic device, e.g. the handheld device 120. The central monitor 101 can be in electronic communication with BRAIN branded products from Armstrong International of Three Rivers, Mich., USA, including water temperature controls, water mixers, recirculation systems, etc.

The presently described methods and systems can provide real-time updates to the status of steam systems and hot water systems. This is particularly true for systems that have automated data reporting from any device in the system. Such automated reporting allows the data to update minute by minute so a real-time view of the system is available. In system's that lack all devices reporting in real-time, then the calculations are made by the central monitor 101 using recent data stored therein. Updates to the calculated results can be made as soon as new data is available, e.g., from a technician entering data in the field using a user device 140 or handheld device 120. The real-time updates can be in the form of alerts that can be electronically transmitted and displayed using indictors of status. The real time alerts may depend on the ability of the mobile devices to timely push the updated information regarding inspected or tested field devices. The mobile device can be set to automatically send updated information to the central monitor as soon as it has a connection.

In operation, monitoring field devices, e.g., steam traps, other steam processing devices, or hot water devices, may include surveying the environment, e.g., a building to locate all existing field devices. The survey may be entered at the central monitor. In an example, the handheld device 120 may be used to inspect the environment and enter the field devices using the graphical user interface of the handheld device 120. The handheld device 120 may identify the field devices using an enterprise, a physical location, the type of installation, the type of use, the type of field device or any other data. The handheld device 120 may also take a picture of the field device. This data can be pushed to the central monitor 101 when the handheld device 120 is at a location where there is a communication link to the central monitor, e.g., a wireless connection or a wired connection. The central monitor 101 can number and organize all of the existing field devices. The central monitor 101 can create and store a master field device location table showing the location of all the field devices.

The central monitor can use its algorithms to decide which field devices to monitor. These field devices can be assigned to a handheld device 120. The data relating to the assigned field devices is downloaded to the handheld device 120 before the handheld device 120 enters the environment, which may limit communication from the handheld device 120. The handheld device 120 will have a graphical user interface that will provide the inspection route or data relating to the field devices to be inspected.

The central monitor 101 can also assign field devices to handheld device 120 when a field device is in need of corrective action, e.g., when the field device is not operating as desired. Such field devices may be indicated using indicators on the graphical user interface to indicate that a field device is operating sub-optimally.

The present disclosure refers to handheld device 120, which may be a mobile device such as smart phones. In addition, it should be understood that the handheld device 120 can also include other mobile devices that are portable by a single person and used in a mobile manner. Such mobile devices include tablets, phablets, wearable technology such as a smart watch, small computers (e.g., netbooks and laptops), testers with processors adapted to hot water or steam applications, and the like. The handheld device 120 utilize specific instructions to communicate with the wand 110 to test industrial components, e.g., field devices such as steam traps.

When a new handheld device 120 is used to inspect a field device or group of field devices for the first time, all of the data for the field device or group of field devices can be downloaded to the handheld device 120. In an example, the control monitor can download the data regarding all of the field devices the night before the inspection or when the inspection of these field devices is assigned to the handheld device 120.

In an example, a handheld device 120 is associated with a specific technician. The handheld device 120 may be that technician's mobile smartphone. When inspection or test locations 112 through 112N are assigned to a technician, the corresponding stored data regarding the field devices covered by the inspections or tests is downloaded from the central monitor 101 to the technician's handheld device 120.

In another example, a handheld device 120 is assigned to a location 112 or a group of field devices. The handheld device 120 can stay on site at the location or near the group of devices. When a technician is assigned to check the field devices at the location or the group, the technician retrieves the handheld device 120, logs into the application running the instructions to carry out the methods described herein and then receives the GUI to find the field devices and receive the testing data from the wand.

The system and methods, in various embodiments, described herein can also address the technical problem of communications in industrial and commercial environments. Hot water and steam systems use significant amounts of metal in their infrastructures or are placed in environments that do not yield quality wireless communication or any wireless communication at all. In some environments, the piping can act as a Faraday cage and block or interrupt the propagation of wireless signals. In some environments, the operation of some industrial processing equipment may also produce stray signal that interfere with wireless signals. The present disclosure improves the communication to and from field devices and handheld devices 120 that are used in the field. The traditional method of taking a clipboard with paper worksheets is inefficient and prone to human error. The control monitor 101 as described herein can store large amounts of data regarding field devices. Data is first generated by the testing wand 110 and set to the handheld device 120 by a short-range communication channel, e.g., Bluetooth. The testing wand 110 can store the data if it does not have a quality connection to the handheld device, e.g., piping of other electrical communication interfering structure is impeding the signal. After collecting data, the wand 110 can be moved closer to the handheld to provide a quality communication link. Data that is pertinent to a specific handheld device 120, e.g., mobile device, can be downloaded to the appropriate mobile device before it enters a communication hostile environment in an example, the control monitor 101 downloads the data for field devices the day before those field devices are to be serviced or checked. In an example, the handheld device 120 runs software that communicates with the control monitor 101. The data can be encrypted for security. When the handheld device 120 is being used and has a poor wireless connection, it can store the updated data. When the mobile device has a quality connection, e.g., a strong WiFi signal or a strong cellular signal (short range communication channels, e.g., Bluetooth), the application running on the mobile device can push the changes to the control monitor 101. As a result, field devices can be checked with accurate data about the devices and changes to the data are communicated back to the control monitor 101 when the mobile device has reliable communication.

The wand 110 of the handheld device 120 can be used with systems and methods to continually and automatically measures the status of components/devices in the steam/hot water system. The system can aggregate the data from the wand 110 of the handheld device 120, which measure component performance in the steam system or the hot water system. This data is processed to produce an output. The output can provide data on a global basis about the system and also on a per device level. The output can be shared with handheld device 120 in the field at locations associated with the steam system or the hot water system.

The hot water or steam monitoring system may include the central monitor 101 to receive and process information from hot water or steam field devices and a plurality of handheld device 120 in communication with the central monitor 101. The handheld device 120 being adapted to display processed data from the central monitor 101 regarding field devices associated with at least one of the plurality of handheld device 120.

In an example, the handheld device 120 includes a history of the associated field device readings downloaded from the central monitor 101.

In an example, the handheld device 120 uses a first gesture to select a field device from a plurality of field devices loaded into the at least one handheld device 120, a second gesture, which is different from the first gesture, to receive data regarding the selected field device, and a third gesture, which is different from the first gesture and the second gesture, to add new field devices to an enterprise location.

In an example, the handheld device 120 may upload the new field device information to the central monitor 101, wherein at least one of the first gesture and the second gesture is not a single tap on a graphical user interface of the at least one mobile device.

In an example, the central monitor 101 issues control signals to the field devices to set operational parameters of the field devices. In another example, the central monitor 101 issues control signals to the handheld device 120 to set operational parameters of the field devices. In yet another example, the central monitor 101 calculates an efficiency value for a field device by using information from hot water or steam field devices and displays the efficiency history of the field device. The central monitor 101 may further display a visual indicator of a current efficiency of the field device and may further transmit data for the visual indicator to the handheld device 120 for the handheld device 120 to display on a graphical user interface.

In an example, the central monitor 101 calculates an efficiency value for a group of the field devices using information from hot water or steam field devices and displays the efficiency history of the group of field devices. In another example, the central monitor 101 displays a visual indicator of a current efficiency of the group of field devices or transmits data for a visual indicator to the handheld device 120 for the handheld device 120 to display on a graphical user interface for the group of field devices.

The central monitor 101 may also download data for a first field device of the hot water or steam field devices to the handheld device 120 when the handheld device 120 is scheduled to review the field device, wherein the data of the first field device includes historical operational data, an image of the first field device, and a status indicator. The handheld device 120 may include an inspection schedule for a plurality of the field devices, and wherein the central monitor 101 downloads stored data for each of the plurality of field device to the handheld device 120, the stored data includes images of each of the field devices, location of each of field devices, a route to inspect the plurality of field devices, and the determined operational state of each of the field devices.

An embodiment of a hot water or steam monitoring system includes a central monitor 101 to receive and process information from hot water or steam field devices. The system further includes a plurality of handheld devices 120 in communication with the central monitor 101 when having a communication channel with the central monitor 101, wherein the handheld devices 120 are configured to update data regarding field devices in a hot water or steam processing environment, the handheld devices 120 providing a graphical user interface with data regarding the field devices and allow for the update of the field device data on a device by device basis, and wherein the handheld device 120 is configured to push changed data to the central monitor 101 when the handheld device 120 returns to a physical location with the communication to the central monitor being reestablished. In an example, the communication between the central monitor 101 and the handheld device 120 is a wireless communication.

The central monitor 101 may further be configured to send a past status of the field devices to an assigned handheld device 120 of the plurality of handheld devices 120. The assigned handheld device 120 receives the past status of the field devices after scheduling but before the assigned handheld device 120 is to be used to inspect the field devices assigned to the assigned handheld device 120. The graphical user interface displays the past status for the assigned field devices and allows a user to traverse data regarding a group of field devices and an individual selected field device in the group of field devices.

In an example, the central monitor 101 downloads data for a field device of the plurality field devices to the handheld device 120 when one of the plurality of handheld device 120 is scheduled to review the field device, wherein the data of the first field device includes historical operational data, an image of the first field device, and a status indicator.

In another example, the central monitor 101 downloads a virtual map of the field devices to be reviewed using one handheld device 120 of the plurality of handheld device 120, wherein data for the field devices along a route to be followed by the one handheld device 120 is stored in the one handheld device 120, and the graphical user interface of the one handheld device 120 displays a recommended route of select ones of the field devices as selected through the graphical user interface.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A component tester, comprising:
   an acoustic probe extending between a distal end and a proximal end, the distal end of the acoustic probe defining a probe tip to contact a device;
   a plurality of acoustic elements including a first acoustic element located adjacent to the proximal end of the probe tip and a second acoustic element spaced apart from the first acoustic element;
   an electrode located between the first acoustic element and the second acoustic element;
   a stud extending internally through the first acoustic element and the second acoustic element and at a distal end into the electrode;
   a stack mass assist in sensing an acoustic signal;
   a head operably connected with the stud proximate the stack mass and electrically connected to the electrode to detect component readings at the probe tip; and
   a temperature sensor including a temperature probe extending outwardly adjacent the acoustic probe to contact the device and sense the temperature of the device.

2. The component tester of claim 1, wherein the temperature sensor further includes a first force sensor to sense force the temperature probe experiences when in contact with the device.

3. The component tester of claim 2, wherein the acoustic probe includes a second force sensor to sense force the acoustic probe experiences when in contact with the device.

4. The component tester of claim 3, wherein at least one of the first force sensor and the second force sensor can trigger a testing operation of the device.

5. The component tester of claim 1, further comprising a shim in an interstice intermediate the first acoustic element and the second acoustic element holding the first acoustic element and the second acoustic element separate and spaced from each other.

6. The component tester of claim 5, further comprising an acoustic isolator attached to the proximal end of the probe.

7. The component tester of claim 6, wherein the first acoustic element and the second acoustic element both have an annular shape defining a central aperture and the stud extends thorough the central aperture of the first acoustic element and the central aperture of the second acoustic element.

8. The component tester of claim 7, wherein the first acoustic element and the second acoustic element are spaced from the stud; wherein the stack mass is adjacent to the second acoustic element opposite to the electrode, wherein the stack mass defines an aperture therein through which the stud extends, and wherein the stud includes a protrusion to load a force of the stack mass to the second acoustic element, the electrode, the first acoustic element, and the acoustic isolator; wherein the head is free from the force loaded from the stack mass; and wherein the first acoustic element and the second acoustic element are not in direct physical contact.

9. The component tester of claim 5, wherein the head includes an amplifier disk to receive a signal from the stud and at least one of the plurality of acoustic elements after the temperature sensor reads a temperature of the device.

10. The component tester of claim 9, wherein the head includes circuitry to process acoustic signals mounted to the amplifier disk and wherein the head further includes a negative ground plane connecting the amplifier disk to the stud.

11. The component tester of claim 10, wherein the circuitry of the head includes a digital signal processor in electrical connection with the head and a communication module for pairing with and transmitting readings to a remote computing device.

12. A system for monitoring a component:
   a central monitor remote from the component;
   a mobile device in communication with the central monitor;
   a wand including:
      i. an acoustic probe to contact and to sense the component acoustically and
      ii. a thermal sensor to sense the component thermally;
   the wand being in communication with the mobile device;
   the acoustic probe extending between a distal end and a proximal end, the distal end of the probe defining a probe tip to contact the component, the probe including:
      iii. a plurality of acoustic elements including a first acoustic element located adjacent to the proximal end of the probe tip and a second acoustic element spaced apart from the first acoustic element;
      iv. an electrode located between the first acoustic element and the second acoustic element;
      V. a stud extending through the first acoustic element and the second acoustic element and at a distal end into the electrode;
      vi. a stack mass adjacent to the second acoustic element and remote from the first acoustic element; and
      vii. a head operably connected with the stud proximate the stack mass and electrically connected to the electrode to detect component readings at the probe tip;
   the central monitor including a storage having component data;
   the mobile device being configured to download component data for a component to be tested from the central monitor;
   the wand being configured to download component data for the component to be tested from the central monitor, the mobile device or both; and
   the component data including an emissivity of the component and contact force for the wand on the component.

13. The system of claim 12, wherein the wand further comprises a temperature sensor aimed adjacent to the probe tip for taking temperature readings of the component associated with the acoustic readings at the probe tip, the temperature sensor including a temperature probe in contact with the component and a first force sensor to sense force experienced by the temperature probe against the component.

14. The system of claim 13, wherein the wand, the mobile device, or both use the emissivity to correct a sensed temperature reading of the component from the temperature sensor.

15. The system of claim 13, wherein the wand stores force range data for the component and displays a force graphical user interface to output whether force during a sensing operation is within the range.

16. The system of claim 13, wherein the wand further includes a second force sensor connected to the acoustic probe to detect force experienced by the probe when in contact with the component.

17. The system of claim 16, wherein the wand is configured to take multiple discrete acoustic readings over a time period, wherein if at least one of the acoustic readings indicates that the component is good with the force readings from both the first force sensor and the second force sensor being with the ranges, respectively, then the wand outputs a signal associated with a good component to the mobile device.

18. The system of claim 16, wherein the wand is configured to take multiple discrete acoustic readings over a time period indicating a good component or a bad component, and wherein if a number of good component readings are greater than a number of bad component readings, then the component is labelled as good and configured to indicate a violation of the force ranges with either a good or a bad labelling of the component.

19. A tester for an industrial component having at least one device, comprising:
- a probe extending between a distal end and a proximal end;
- the distal end of the probe defining a probe tip to contact the device;
- a first acoustic element located adjacent to the proximal end of the probe tip;
- a second acoustic element spaced apart from the first acoustic element;
- an electrode located between the first acoustic element and the second acoustic element;
- a stud extending through the first acoustic element and the second acoustic element and at a distal end into the electrode;
- a stack mass to assist with sensing acoustic signals at the probe;
- a head operably on the stud proximate the stack mass and electrically connected to the electrode to detect acoustic signals at the probe tip; and
- a device reader to read an identifier associated with the device to associate the acoustic signals at the probe tip to the device.

20. The tester of claim 19, wherein the tester further comprises a temperature sensor aimed adjacent to the probe tip for taking thermal readings of the device associated with the acoustic readings at the probe tip; and wherein the probe is configured to take multiple discrete acoustic readings over a time period, and based on a setting to indicate that the device is good if at least one acoustic reading is good, if a number of good device readings are greater than a number of bad device readings, or a combination thereof, then the head outputs a signal associated with a good device to a mobile device.

* * * * *